US009898985B2

United States Patent
Cao

(10) Patent No.: US 9,898,985 B2
(45) Date of Patent: Feb. 20, 2018

(54) GATE ON ARRAY DRIVE SYSTEM OF RAISING YIELD AND LIQUID CRYSTAL PANEL HAVING THE SAME

(71) Applicants: Shenzhen China Star Optoelectronics Technology Co., Ltd., Shenzhen (CN); Wuhan China Star Optoelectronics Technology Co., Ltd., Wuhan (CN)

(72) Inventor: Shangcao Cao, Shenzhen (CN)

(73) Assignees: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 288 days.

(21) Appl. No.: 14/779,334

(22) PCT Filed: Aug. 24, 2015

(86) PCT No.: PCT/CN2015/087962
§ 371 (c)(1),
(2) Date: Sep. 23, 2015

(87) PCT Pub. No.: WO2017/028324
PCT Pub. Date: Feb. 23, 2017

(65) Prior Publication Data
US 2017/0256216 A1    Sep. 7, 2017

(30) Foreign Application Priority Data

Aug. 19, 2015  (CN) .......................... 2015 1 0512091

(51) Int. Cl.
*G09G 3/36*    (2006.01)
*G02F 1/1368*  (2006.01)

(52) U.S. Cl.
CPC ......... *G09G 3/3677* (2013.01); *G02F 1/1368* (2013.01); *G09G 2300/0408* (2013.01); *G09G 2320/0693* (2013.01)

(58) Field of Classification Search
CPC ......... G09G 3/3677; G09G 2300/0408; G09G 2320/0693; G02F 1/1368
See application file for complete search history.

(56) References Cited

U.S. PATENT DOCUMENTS 6,067,067 A * 5/2000 Park ..................... G09G 3/3677
                                                345/100
2001/0022565 A1* 9/2001 Kimura ................ G09G 3/3266
                                                345/82

(Continued)

FOREIGN PATENT DOCUMENTS

TW          200943262 A        10/2009

*Primary Examiner* — Sejoon Ahn
(74) *Attorney, Agent, or Firm* — Leong C. Lei

(57) ABSTRACT

The present invention provides a GOA drive system and a liquid crystal panel. Two GOA modules (2) are respectively provided at two sides of the liquid crystal display area (1), and each GOA module (2) is electrically coupled to one automatic detection interrupting function module (3) correspondingly, and each automatic detection interrupting function module (3) receives a feedback signal (FB) transmitted from the GOA unit circuit of the last stage of the GOA module (2), and by detecting whether the feedback signal (FB) is normal or abnormal, the scan start signal (STV) is transmitted or not transmitted to the corresponding GOA module (2) to normally drive the corresponding GOA module (2) or terminate driving so that as the GOA module (2) at one side of the liquid crystal panel display area (1) appears to be abnormal, the corresponding automatic detection interrupting function module (3) terminates driving the abnormal GOA module (2), and the GOA module (2) at the other side of the liquid crystal panel display area (1) continues normal (Continued)

driving, which contributes to raise the yield of the liquid crystal panel.

14 Claims, 3 Drawing Sheets

(56) References Cited

U.S. PATENT DOCUMENTS

| | | | | |
|---|---|---|---|---|
| 2004/0189586 A1* | 9/2004 | Nagase | ................ | G09G 3/3648 345/100 |
| 2010/0117943 A1* | 5/2010 | Pak | ................... | G02F 1/133512 345/89 |
| 2015/0262528 A1* | 9/2015 | Takahara | ............. | G09G 3/3225 345/212 |

* cited by examiner

GATE ON ARRAY DRIVE SYSTEM OF RAISING YIELD AND LIQUID CRYSTAL PANEL HAVING THE SAME

FIELD OF THE INVENTION

The present invention relates to a display technology field, and more particularly to a gate on array (GOA) drive system of raising yield and a liquid crystal panel using the same.

BACKGROUND OF THE INVENTION

The Liquid Crystal Display (LCD) possesses advantages of thin body, power saving and no radiation to be widely used in many application scope, such as LCD TV, mobile phone, personal digital assistant (PDA), digital camera, notebook, laptop, and dominates the flat panel display field.

Most of the liquid crystal displays on the present market are backlight type liquid crystal displays, which comprise a liquid crystal display panel and a backlight module. The working principle of the liquid crystal panel is that the Liquid Crystal is injected between the Thin Film Transistor Array Substrate (TFT array substrate) and the Color Filter (CF). The light of backlight module is refracted to generate images by applying driving voltages to the two substrates for controlling the rotations of the liquid crystal molecules.

In the active liquid crystal panel, each pixel is electrically coupled to a thin film transistor (TFT), and the gate of the thin film transistor is coupled to a level scan line, and the drain is coupled to a vertical data line, and the source is coupled to the pixel electrode. The enough voltage is applied to the level scan line, and all the TFTs electrically coupled to the horizontal scan line are activated. Thus, the signal voltage on the data line can be written into the pixel to control the transmittances of different liquid crystals to achieve the effect of controlling colors and brightness. The GOA (Gate Driver on Array) technology, i.e. the array substrate row driving technology is to utilize the array manufacture process of the liquid crystal display panel to manufacture the gate driving circuit on the TFT array substrate for realizing the driving way of scanning the gates row by row. The GOA circuit has advantages of reducing the production cost and realizing the narrow frame design, which is suitable for the liquid crystal panel.

According to the difference material used for the active layer, the GOA circuit can be an Amorphous silicon (a-Si) GOA circuit, an Indium Gallium Zinc Oxide (IGZO) GOA circuit, and a Low Temperature Ploy Silicon (LTPS) GOA circuit. The issue that there is difference of TFT electrical stability exists in either kind of GOA circuits. The present liquid crystal panel only provides a GOA circuit at one side of the display area in general, i.e. the GOA single side driving. Once the GOA is abnormal, the entire liquid crystal panel will be influenced to cause the lower yield of the liquid crystal panel.

SUMMARY OF THE INVENTION

An objective of the present invention is to provide a gate on array (GOA) drive system capable of raising the yield of the liquid crystal panel.

Another objective of the present invention is to provide a liquid crystal panel having higher yield.

For realizing the aforesaid objectives, the present invention provides a GOA drive system, comprising:

two independent GOA modules, respectively positioned at two sides of a liquid crystal panel display area, and each GOA module comprises a plurality of GOA unit circuits which are cascade connected;

two independent automatic detection interrupting function modules, and each automatic detection interrupting function module is electrically coupled to one GOA module correspondingly; and a drive integrated circuit (IC), electrically coupled to both of the two automatic detection interrupting function modules;

the drive IC provides a detection control signal and a scan start signal to each automatic detection interrupting function module;

each automatic detection interrupting function module receives a feedback signal transmitted from the GOA unit circuit of the last stage of the GOA module, and by detecting whether the feedback signal is normal or abnormal, the scan start signal is transmitted or not transmitted to the corresponding GOA module to normally drive the corresponding GOA module or terminate driving so that as the GOA module at one side of the liquid crystal panel display area appears to be abnormal, the corresponding automatic detection interrupting function module terminates driving the abnormal GOA module, and the GOA module at the other side of the liquid crystal panel display area continues normal driving.

The automatic detection interrupting function module comprises: a first thin film transistor, a second thin film transistor, a third thin film transistor, a fourth thin film transistor, a fifth thin film transistor, a sixth thin film transistor, a first capacitor and a second capacitor;

a gate of the first thin film transistor receives the feedback signal, and a source is coupled to a constant high voltage level; a gate of the second thin film transistor receives the detection control signal, and a source is coupled to a drain of the first thin film transistor; a gate of the third thin film transistor receives the feedback signal, and a source is coupled to the constant high voltage level, and a drain is coupled to a node; a gate of the fourth thin film transistor is coupled to a drain of the second thin film transistor, and a source is coupled to a node, and a drain is coupled to a constant low voltage level; a gate of the fifth thin film transistor is coupled to a node, and a source receives the scan start signal, and a drain is coupled to the corresponding GOA module; a gate of the sixth thin film transistor receives a gate scan signal of the GOA unit circuit of the first stage, and a source is coupled to a node, and a drain is coupled to the constant low voltage level; one end of the first capacitor is coupled to the drain of the second thin film transistor, and the other end is grounded; one end of the second capacitor is coupled to a node, and the other end is coupled to the drain of the fifth thin film transistor.

The feedback signal is a gate scan signal which is outputted corresponding to the GOA unit circuit of the last stage of the GOA module.

The normal feedback signal is a signal having a single pulse, and the third thin film transistor is activated, and the fifth thin film transistor is normally activated to transmit the scan start signal to the corresponding GOA module to normally drive the corresponding GOA module.

The abnormal feedback is a direct current low voltage level signal, and the third thin film transistor remains to be deactivated, and the fifth thin film transistor cannot be normally activated to transmit the scan start signal to the corresponding GOA module to terminate driving the corresponding GOA module.

The abnormal feedback is a signal having a plurality of pulses, and the fourth thin film transistor is activated, and the fifth thin film transistor cannot be normally activated to transmit the scan start signal to the corresponding GOA module to terminate driving the corresponding GOA module.

The detection control signal advances a pulse width than the normal feedback signal.

The drive IC utilizes Chip On Glass.

The present invention further provides a liquid crystal panel, comprising the aforesaid GOA drive system.

The benefits of the present invention are: the present invention provides a GOA drive system and a liquid crystal panel. Two GOA modules are respectively provided at two sides of the liquid crystal display area, and each GOA module is electrically coupled to one automatic detection interrupting function module correspondingly, and each automatic detection interrupting function module receives a feedback signal transmitted from the GOA unit circuit of the last stage of the GOA module, and by detecting whether the feedback signal is normal or abnormal, the scan start signal is transmitted or not transmitted to the corresponding GOA module to normally drive the corresponding GOA module or terminate driving so that as the GOA module at one side of the liquid crystal panel display area appears to be abnormal, the corresponding automatic detection interrupting function module terminates driving the abnormal GOA module, and the GOA module at the other side of the liquid crystal panel display area continues normal driving. Thus the interference to display caused by the abnormal GOA module at one side can be prevented to contribute to raise the yield of the liquid crystal panel.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
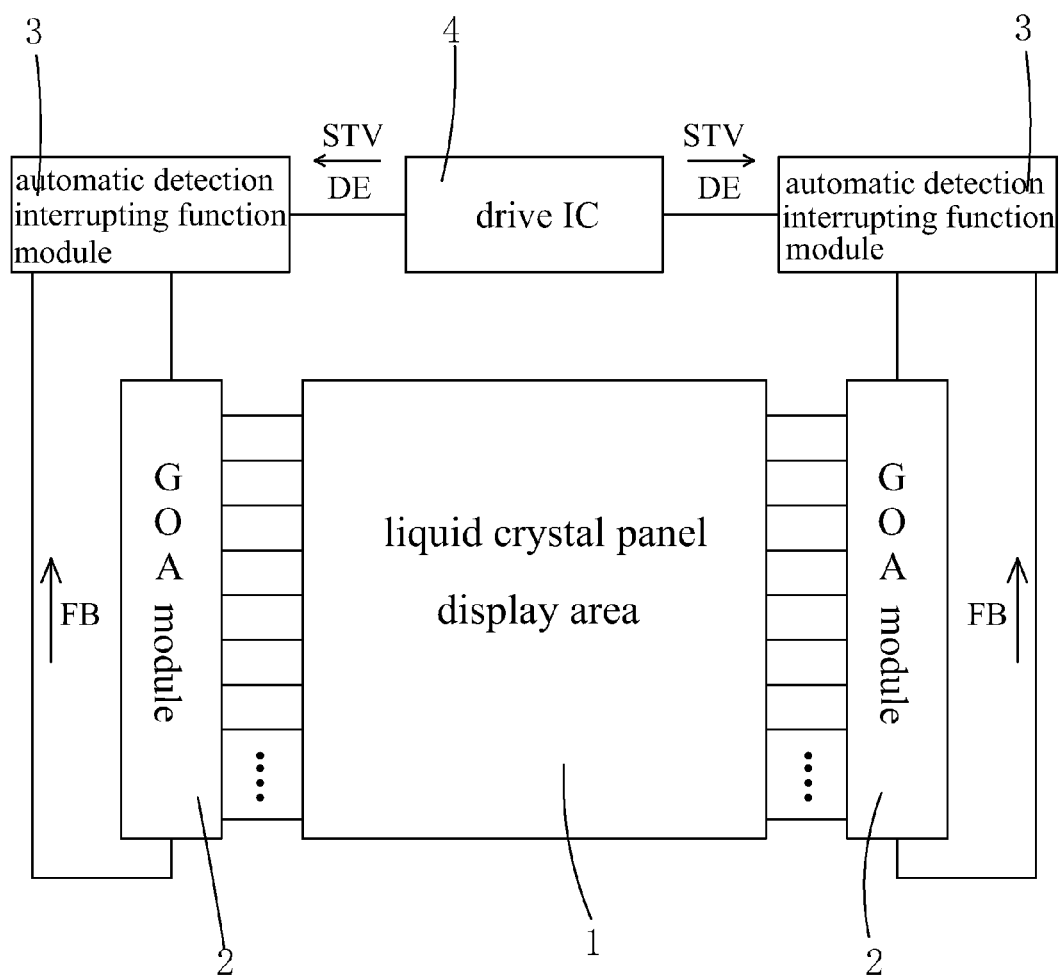
FIG. 1 is a structure block diagram of a GOA drive system according to the present invention.

Please refer to FIG. 1. The present invention first provides a GOA drive display, comprising:

two independent GOA modules 2, respectively positioned at two sides of a liquid crystal panel display area 1, and each GOA module 2 comprises a plurality of GOA unit circuits which are cascade connected;

two independent automatic detection interrupting function modules 3, and each automatic detection interrupting function module 3 is electrically coupled to one GOA module 2 correspondingly; and a drive IC 4, electrically coupled to both of the two automatic detection interrupting function modules 3;

Furthermore, the drive IC 4 provides a detection control signal DE and a scan start signal STV to each automatic detection interrupting function module 3. Each automatic detection interrupting function module 3 receives a feedback signal transmitted from the GOA unit circuit of the last stage of the GOA module 2, and by detecting whether the feedback signal FB is normal or abnormal, the scan start signal STV is transmitted or not transmitted to the corresponding GOA module 2 to normally drive the corresponding GOA module 2 or terminate driving so that as the GOA module 2 at one side of the liquid crystal panel display area 1 appears to be abnormal, the corresponding automatic detection interrupting function module 3 terminates driving the abnormal GOA module 2, and the GOA module 2 at the other side of the liquid crystal panel display area 1 continues normal driving.

Specifically, the drive IC 4 utilizes a regular Chip on Glass (COG).

A plurality of GOA unit circuits which are cascade connected in the GOA module 2 are respectively employed to correspondingly drive TFTs of one row in the liquid crystal panel display area 1.

Figure 2:
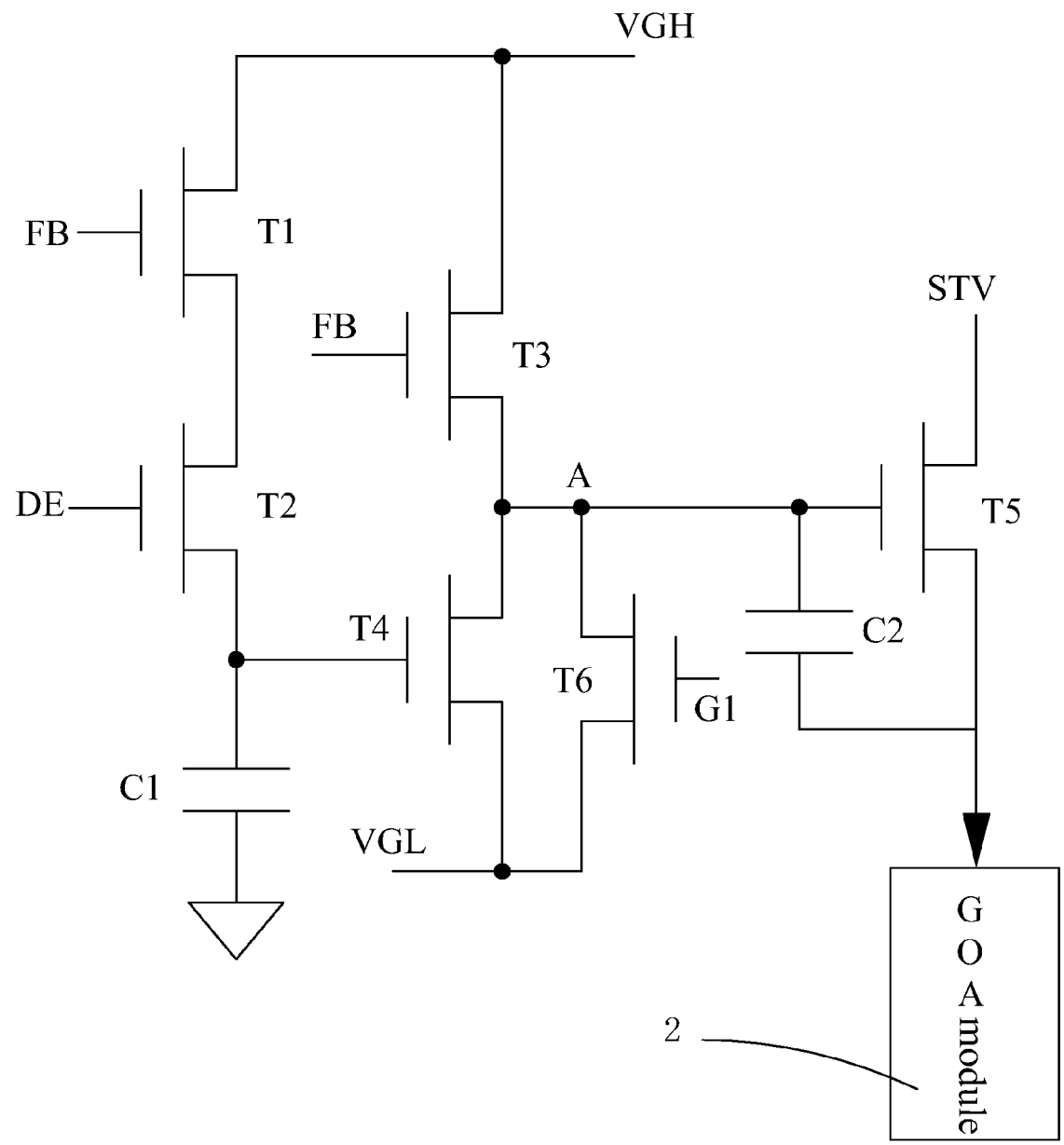
FIG. 2 is a circuit diagram of an automatic detection interrupting function module in the GOA drive system according to the present invention.

Please refer to FIG. 2. The automatic detection interrupting function module 3 comprises: a first thin film transistor T1, a second thin film transistor T2, a third thin film transistor T3, a fourth thin film transistor T4, a fifth thin film transistor T5, a sixth thin film transistor T6, a first capacitor C1 and a second capacitor C2.

A gate of the first thin film transistor T1 receives the feedback signal FB, and a source is coupled to a constant high voltage level VGH; a gate of the second thin film transistor T2 receives the detection control signal DE, and a source is coupled to a drain of the first thin film transistor T1; a gate of the third thin film transistor T3 receives the feedback signal FB, and a source is coupled to the constant high voltage level VGH, and a drain is coupled to a node A; a gate of the fourth thin film transistor T4 is coupled to a drain of the second thin film transistor T2, and a source is coupled to the node A, and a drain is coupled to a constant low voltage level VGL; a gate of the fifth thin film transistor T5 is coupled to the node A, and a source receives the scan start signal STV, and a drain is coupled to the corresponding GOA module 2; a gate of the sixth thin film transistor T6 receives a gate scan signal G1 of the GOA unit circuit of the first stage, and a source is coupled to the node A, and a drain is coupled to the constant low voltage level VGL; one end of the first capacitor C1 is coupled to the drain of the second thin film transistor T2, and the other end is grounded; one end of the second capacitor C2 is coupled to the node A, and the other end is coupled to the drain of the fifth thin film transistor T5.

The feedback signal FB is a gate scan signal which is outputted corresponding to the GOA unit circuit of the last stage of the GOA module 2.

Figure 3:
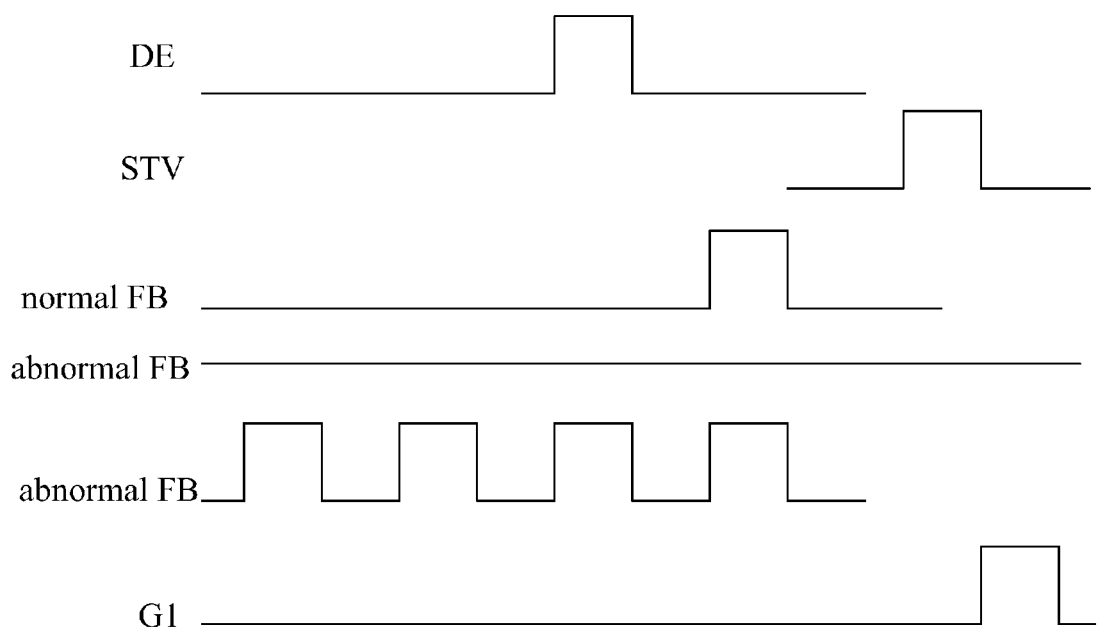
FIG. 3 is a signal sequence diagram of the GOA drive system according to the present invention.

Please refer to FIG. 3 with combination of FIG. 2 and FIG. 1. The normal feedback signal FB is a signal having a single pulse, and the detection control signal DE advances a pulse width than the normal feedback signal FB. Under circumstance that the automatic detection interrupting function module 3 receives the normal feedback signal FB, the third thin film transistor T3 is activated, and the fourth thin film transistor T4 is deactivated, and the constant high voltage level VGH is received by the gate of the fifth thin film transistor T5, and the fifth thin film transistor T5 is normally activated to transmit the scan start signal STV to the corresponding GOA module 2 to normally drive the corresponding GOA module 2.

The abnormal feedback signals FB have two kinds of conditions:

the first condition is the abnormal feedback signal FB because the stage transfer signals of the GOA unit circuits of the respective stages in the GOA module 2 cannot be normally transmitted. Under such circumstance, the abnormal feedback signal FB is a direct current low voltage level signal. The automatic detection interrupting function module 3 receives the abnormal feedback signal FB, and the third thin film transistor T3 remains to be deactivated, and the fifth thin film transistor T5 cannot be normally activated to transmit the scan start signal STV to the corresponding GOA module 2 to terminate driving the corresponding GOA module 2.

The second condition is the abnormal feedback sign because issues happen at the output parts of the GOA unit circuits of the respective stages in the GOA module 2. Under such circumstance, the abnormal feedback signal FB is in accordance with the corresponding clock signal sequence, which is a signal having a plurality of pulses. The automatic detection interrupting function module 3 receives the abnormal feedback signal FB, and as the detection control signal DE is high voltage level, the abnormal feedback signal FB is high voltage level, too, and the first thin film transistor T1 and the second thin film transistor T2 are activated, and the constant high voltage level VGH is received by the gate of the fourth thin film transistor T4 to activate the fourth thin film transistor T4, and the node A and the gate voltage level of the fifth thin film transistor T5 are pulled down to the constant low voltage level VGL, which results in that the fifth thin film transistor T5 cannot be normally activated to transmit the scan start signal STV to the corresponding GOA module 2 to terminate driving the corresponding GOA module 2.

Two GOA modules 2 are respectively provided at two sides of the liquid crystal display area 1, and each GOA module 2 is electrically coupled to one automatic detection interrupting function module 3 correspondingly, and each automatic detection interrupting function module 3 receives a feedback signal transmitted from the GOA unit circuit of the last stage of the GOA module 2, the present invention realizes that as the GOA module 2 at one side of the liquid crystal panel display area 1 appears to be abnormal, the corresponding automatic detection interrupting function module 3 terminates driving the abnormal GOA module 2, and the GOA module 2 at the other side of the liquid crystal panel display area 1 continues normal driving. Thus the interference to display caused by the abnormal GOA module at one side can be prevented to contribute to raise the yield of the liquid crystal panel.

The present invention further provides a liquid crystal panel, comprising the aforesaid GOA drive system shown in FIG. 1.

In conclusion, in the GOA drive system and the liquid crystal panel of the present invention, two GOA modules are respectively provided at two sides of the liquid crystal display area, and each GOA module is electrically coupled to one automatic detection interrupting function module correspondingly, and each automatic detection interrupting function module receives a feedback signal transmitted from the GOA unit circuit of the last stage of the GOA module, and by detecting whether the feedback signal is normal or abnormal, the scan start signal is transmitted or not transmitted to the corresponding GOA module to normally drive the corresponding GOA module or terminate driving so that as the GOA module at one side of the liquid crystal panel display area appears to be abnormal, the corresponding automatic detection interrupting function module terminates driving the abnormal GOA module, and the GOA module at the other side of the liquid crystal panel display area continues normal driving. Thus the interference to display caused by the abnormal GOA module at one side can be prevented to contribute to raise the yield of the liquid crystal panel.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A gate on array (GOA) drive system, comprising:

two independent GOA modules, respectively positioned at two sides of a display area of a liquid crystal display panel, and each GOA modules comprises a plurality of GOA unit circuits which are cascade connected;

two independent automatic detection interrupting function modules, and each automatic detection interrupting function modules are electrically coupled to each GOA modules correspondingly; and a drive integrated circuit (IC), electrically coupled to both of the two automatic detection interrupting function modules, wherein the drive IC configured to provide a detection control signal and a scan start signal to each of the automatic detection interrupting function modules;

each automatic detection interrupting function modules receives a feedback signal transmitted from the GOA unit circuit of last stage of the GOA modules, and configured to detect whether the feedback signal is normal or abnormal, if the feedback signal is normal, then the scan start signal is transmitted to the corresponding GOA module to drive the corresponding GOA module;

if the feedback signal is abnormal, then the scan start signal is not transmitted so as to terminate driving the GOA module at one side of the liquid crystal panel display area, the corresponding automatic detection interrupting function module terminates driving the GOA module of which the GOA unit circuit of the last stage transmits the abnormal feedback signal, and the GOA module at the other side of the liquid crystal panel display area continues driving, wherein each of the automatic detection interrupting function modules comprises:

a first thin film transistor, a second thin film transistor, a third thin film transistor, a fourth thin film transistor, a fifth thin film transistor, a sixth thin film transistor, a first capacitor and a second capacitor; a gate of the first thin film transistor receives the feedback signal, and a source is coupled to a constant high voltage level; a gate of the second thin film transistor receives the detection control signal, and a source is coupled to a drain of the first thin film transistor; a gate of the third thin film transistor receives the feedback signal, and a source is coupled to the constant high voltage level, and a drain is coupled to a node; a gate of the fourth thin film transistor is coupled to a drain of the second thin film transistor, and a source is coupled to a node, and a drain is coupled to a constant low voltage level; a gate of the fifth thin film transistor is coupled to a node, and a source receives the scan start signal, and a drain is coupled to the corresponding GOA module; a gate of the sixth thin film transistor receives a gate scan signal of the GOA unit circuit of the first stage, and a source is coupled to a node, and a drain is coupled to the constant low voltage level; one end of the first capacitor is coupled to the drain of the second thin film transistor, and the other end is grounded; one end of the second capacitor is coupled to a node, and the other end is coupled to the drain of the fifth thin film transistor.

2. The GOA drive system according to claim 1, wherein the feedback signal is a gate scan signal which is outputted corresponding to the GOA unit circuit of the last stage of the GOA module.

3. The GOA drive system according to claim 2, wherein the normal feedback signal is a signal having a single pulse, and the third thin film transistor is activated, and the fifth thin film transistor is normally activated to transmit the scan start signal to the corresponding GOA module to normally drive the corresponding GOA module.

4. The GOA drive system according to claim 2, wherein the abnormal feedback is a direct current low voltage level signal, and the third thin film transistor remains to be deactivated, and the fifth thin film transistor cannot be normally activated to transmit the scan start signal to the corresponding GOA module to terminate driving the corresponding GOA module.

5. The GOA drive system according to claim 2, wherein the abnormal feedback is a signal having a plurality of pulses, and the fourth thin film transistor is activated, and the fifth thin film transistor cannot be normally activated to transmit the scan start signal to the corresponding GOA module to terminate driving the corresponding GOA module.

6. The GOA drive system according to claim 3, wherein the detection control signal is one pulse width ahead of the normal feedback signal.

7. The GOA drive system according to claim 1, wherein the drive IC utilizes Chip On Glass.

8. A liquid crystal panel, comprising:
a gate on array (GOA) drive system, wherein the GOA drive system includes:
two independent GOA modules, respectively positioned at two sides of a display area of a liquid crystal display panel, and each GOA modules comprises a plurality of GOA unit circuits which are cascade connected;
two independent automatic detection interrupting function modules, and each automatic detection interrupting function modules are electrically coupled to each GOA modules correspondingly; and
a drive integrated circuit (IC), electrically coupled to both of the two automatic detection interrupting function modules,
wherein the drive IC configured to provide a detection control signal and a scan start signal to each of the automatic detection interrupting function modules;
each automatic detection interrupting function modules receives a feedback signal transmitted from the GOA unit circuit of last stage of the GOA modules, and configured to detect whether the feedback signal is normal or abnormal,
if the feedback signal is normal, then the scan start signal is transmitted to the corresponding GOA module to drive the corresponding GOA module;
if the feedback signal is abnormal, then the scan start signal is not transmitted so as to terminate driving the GOA module at one side of the liquid crystal panel display area, the corresponding automatic detection interrupting function module terminates driving the GOA module of which the GOA unit circuit of the last stage transmits the abnormal feedback signal, and the GOA module at the other side of the liquid crystal panel display area continues driving,
wherein each of the automatic detection interrupting function modules comprises:
a first thin film transistor, a second thin film transistor, a third thin film transistor, a fourth thin film transistor, a fifth thin film transistor, a sixth thin film transistor, a first capacitor and a second capacitor; a gate of the first thin film transistor receives the feedback signal, and a source is coupled to a constant high voltage level; a gate of the second thin film transistor receives the detection control signal, and a source is coupled to a drain of the first thin film transistor; a gate of the third thin film transistor receives the feedback signal, and a source is coupled to the constant high voltage level, and a drain is coupled to a node; a gate of the fourth thin film transistor is coupled to a drain of the second thin film transistor, and a source is coupled to a node, and a drain is coupled to a constant low voltage level; a gate of the fifth thin film transistor is coupled to a node, and a source receives the scan start signal, and a drain is coupled to the corresponding GOA module; a gate of the sixth thin film transistor receives a gate scan signal of the GOA unit circuit of the first stage, and a source is coupled to a node, and a drain is coupled to the constant low voltage level; one end of the first capacitor is coupled to the drain of the second thin film transistor, and the other end is grounded; one end of the second capacitor is coupled to a node, and the other end is coupled to the drain of the fifth thin film transistor.

9. The liquid crystal panel according to claim 8, wherein the feedback signal is a gate scan signal which is outputted corresponding to the GOA unit circuit of the last stage of the GOA module.

10. The liquid crystal panel according to claim 9, wherein the normal feedback signal is a signal having a single pulse, and the third thin film transistor is activated, and the fifth thin film transistor is normally activated to transmit the scan start signal to the corresponding GOA module to normally drive the corresponding GOA module.

11. The liquid crystal panel according to claim 9, wherein the abnormal feedback is a direct current low voltage level signal, and the third thin film transistor remains to be deactivated, and the fifth thin film transistor cannot be normally activated to transmit the scan start signal to the corresponding GOA module to terminate driving the corresponding GOA module.

12. The liquid crystal panel according to claim 9, wherein the abnormal feedback is a signal having a plurality of pulses, and the fourth thin film transistor is activated, and the fifth thin film transistor cannot be normally activated to transmit the scan start signal to the corresponding GOA module to terminate driving the corresponding GOA module.

13. The liquid crystal panel according to claim 10, wherein the detection control signal is one pulse width ahead of the normal feedback signal.

14. The liquid crystal panel according to claim 8, wherein the drive IC utilizes Chip On Glass.

\* \* \* \* \*